(12) United States Patent
Zhu et al.

(10) Patent No.: US 12,132,847 B2
(45) Date of Patent: *Oct. 29, 2024

(54) COMPOSITE PLATE, COMPOSITE PLATE ROUGHENING DEVICE, AND METHOD FOR MANUFACTURING COMPOSITE PLATE

(71) Applicant: JIANGSU KANGRUI NEW MATERIAL TECHNOLOGY CO., LTD., Jiangyin (CN)

(72) Inventors: Wei Zhu, Jiangyin (CN); Zhong Zhang, Jiangyin (CN)

(73) Assignee: Jiangsu Kangrui New Material Technology Co., Ltd., Jiangyin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/026,715

(22) PCT Filed: Feb. 24, 2022

(86) PCT No.: PCT/CN2022/077564
§ 371 (c)(1),
(2) Date: Mar. 16, 2023

(87) PCT Pub. No.: WO2022/183957
PCT Pub. Date: Sep. 9, 2022

(65) Prior Publication Data
US 2023/0339211 A1 Oct. 26, 2023

(30) Foreign Application Priority Data

Mar. 5, 2021 (CN) .......................... 202110246015.6
Mar. 5, 2021 (CN) .......................... 202110246026.4
(Continued)

(51) Int. Cl.
*H04M 1/02* (2006.01)
*B21D 51/16* (2006.01)
(Continued)

(52) U.S. Cl.
CPC ............ *H04M 1/026* (2013.01); *B21D 51/16* (2013.01); *B32B 15/01* (2013.01); *B32B 15/012* (2013.01);
(Continued)

(58) Field of Classification Search
None
See application file for complete search history.

(56) References Cited

U.S. PATENT DOCUMENTS 5,115,660 A 5/1992 Kurobe et al.

FOREIGN PATENT DOCUMENTS

CN 1586751 A 3/2005
CN 101559557 A 10/2009
(Continued)

OTHER PUBLICATIONS

U.S. Appl. No. 17/800,317, filed Aug. 17, 2022, Jiangsu Kangrui New Material Technology Co., Ltd.
(Continued)

*Primary Examiner* — Xiaobei Wang
(74) *Attorney, Agent, or Firm* — Zhu Lehnhoff LLP

(57) ABSTRACT

The present invention provides a composite plate, a composite plate roughening device, and a method for manufacturing a composite plate, and relates to the technical field of metal plate materials. The composite plate includes a first plate and a second plate, wherein a first side surface of the first plate is provided with striations, the first side surface of the second plate and the first side surface of the first plate are rolled to connect, and the striations of which adjacent ones have a pitch of 0.005 mm to 0.03 mm account for more than 90% of all the striations. For the composite plate described in the embodiments of the present invention, the first side surface of the first plate is roughened such that the first side surface of the first plate and/or the first side surface of the
(Continued)

second plate is configured with striations, which increases an area of the first plate and the second plate subjected to rolling, whereby the composite plate produced by combining the first plate and the second plate has a higher bonding strength and thus a stronger bonding.

20 Claims, 2 Drawing Sheets

(30) Foreign Application Priority Data

| | | |
|---|---|---|
| Mar. 5, 2021 | (CN) | 202110247262.8 |
| Mar. 5, 2021 | (CN) | 202110247263.2 |
| Mar. 5, 2021 | (CN) | 202110247280.6 |
| May 8, 2021 | (CN) | 202110498802.X |
| May 8, 2021 | (CN) | 202110498999.7 |
| May 8, 2021 | (CN) | 202110499000.0 |
| May 8, 2021 | (CN) | 202110499008.7 |
| May 8, 2021 | (CN) | 202110499009.1 |
| Oct. 12, 2021 | (WO) | PCT/CN2021123163 |
| Nov. 1, 2021 | (WO) | PCT/CN2021/123161 |
| Nov. 1, 2021 | (WO) | PCT/CN2021/123162 |

(51) Int. Cl.

| | |
|---|---|
| *B32B 15/01* | (2006.01) |
| *B32B 15/20* | (2006.01) |
| *B32B 37/00* | (2006.01) |
| *B32B 37/06* | (2006.01) |
| *B32B 37/10* | (2006.01) |
| *B32B 38/00* | (2006.01) |
| *B32B 38/16* | (2006.01) |

(52) U.S. Cl.
CPC ............ *B32B 15/017* (2013.01); *B32B 15/20* (2013.01); *B32B 37/0053* (2013.01); *B32B 37/06* (2013.01); *B32B 37/10* (2013.01); *B32B 38/0012* (2013.01); *B32B 38/162* (2013.01); B32B 2307/536 (2013.01); B32B 2307/538 (2013.01); B32B 2307/54 (2013.01); B32B 2307/542 (2013.01); B32B 2307/7375 (2023.05); B32B 2307/7376 (2023.05); B32B 2311/18 (2013.01); B32B 2311/24 (2013.01); B32B 2311/30 (2013.01); *Y10T 428/12201* (2015.01); *Y10T 428/12743* (2015.01)

(56) References Cited

FOREIGN PATENT DOCUMENTS

| | | |
|---|---|---|
| CN | 102658686 A | 9/2012 |
| CN | 202623400 U | 12/2012 |
| CN | 102848136 A | 1/2013 |
| CN | 103394975 A | 11/2013 |
| CN | 203494905 U | 3/2014 |
| CN | 204701208 U | 10/2015 |
| CN | 105034526 A | 11/2015 |
| CN | 105478475 A | 4/2016 |
| CN | 105499269 A | 4/2016 |
| CN | 105798062 A | 7/2016 |
| CN | 106862271 A | 6/2017 |
| CN | 107278385 A | 10/2017 |
| CN | 107377656 A | 11/2017 |
| CN | 206728104 U | 12/2017 |
| CN | 107613048 A | 1/2018 |
| CN | 107770306 A | 3/2018 |
| CN | 107937775 A | 4/2018 |
| CN | 207442919 U | 6/2018 |
| CN | 208826189 U | 5/2019 |
| CN | 209105265 U | 7/2019 |
| CN | 110654081 A | 1/2020 |
| CN | 110654082 A | 1/2020 |
| CN | 110665968 A | 1/2020 |
| CN | 110681694 A | 1/2020 |
| CN | 110883093 A | 3/2020 |
| CN | 111318564 A | 6/2020 |
| CN | 111421446 A | 7/2020 |
| CN | 111715710 A | 9/2020 |
| CN | 112139237 A | 12/2020 |
| CN | 212240477 U | 12/2020 |
| EP | 2892663 A1 | 7/2015 |
| JP | 2000312979 A | 11/2000 |
| JP | 2003094318 A | 4/2003 |
| JP | 2009255171 A | 11/2009 |
| JP | 2015128883 A | 7/2015 |
| KR | 20180102844 A | 9/2018 |
| WO | 2014037545 A1 | 3/2014 |
| WO | 2016207063 A1 | 12/2016 |
| WO | 2018181717 A1 | 10/2018 |

OTHER PUBLICATIONS

U.S. Appl. No. 17/917,220, filed Oct. 5, 2022, Jiangsu Kangrui New Material Technology Co., Ltd.
U.S. Appl. No. 17/917,224, filed Oct. 5, 2022, Jiangsu Kangrui New Material Technology Co., Ltd.
U.S. Appl. No. 18/026,715, filed Mar. 16, 2023, Jiangsu Kangrui New Material Technology Co., Ltd.
U.S. Appl. No. 18/026,730, filed Mar. 16, 2023, Jiangsu Kangrui New Material Technology Co., Ltd.
U.S. Appl. No. 18/026,737, filed Mar. 16, 2023, Jiangsu Kangrui New Material Technology Co., Ltd.
International Search Report, issued in PCT/CN2022/077564, dated May 31, 2022.
Written Opinion, issued in PCT/CN2022/077564, dated May 31, 2022.
International Search Report, issued in PCT/CN2022/077565, dated May 27, 2022.
Written Opinion, issued in PCT/CN2022/077565, dated May 27, 2022.
International Search Report, issued in PCT/CN2022/077563, dated May 26, 2022.
Written Opinion, issued in PCT/CN2022/077563, dated May 26, 2022.
International Search Report, issued in PCT/CN2021/123162, dated Jan. 17, 2022.
Written Opinion, issued in PCT/CN2021/123162, dated Jan. 17, 2022.
International Search Report, issued in PCT/CN2021/123163, dated Jan. 18, 2022.
Written Opinion, issued in PCT/CN2021/123163, dated Jan. 18, 2022.
International Search Report, issued in PCT/CN2021/123161, dated Mar. 2, 2022.
Written Opinion, issued in PCT/CN2021/123161, dated Mar. 2, 2022.
Extended European Search Report, issued in EP22762423.6 (EPO counterpart), dated Aug. 21, 2024.
Partial Supplementary European Search Report, issued in EP22762424.4, dated Sep. 4, 2024.

COMPOSITE PLATE, COMPOSITE PLATE ROUGHENING DEVICE, AND METHOD FOR MANUFACTURING COMPOSITE PLATE

TECHNICAL FIELD

The present invention relates to the technical field of metal plate materials, more particularly, to a composite plate, a composite plate roughening device, and a method for manufacturing the composite plate.

BACKGROUND ART

The advent of the age of intelligence has witnessed an increasing demand of people for cell phones. Cell phone manufacturers are trying their best in innovating and redesigning various features of cell phones to attract consumers. Many processes and methods have been tried in manufacturing a cover plate, an important part of a cell phone, which, however, has often been ended up with failures, therefore, the choice of method is extremely critical because it directly affects the yield and production efficiency.

A steel-aluminum composite plate is advantageous by the high strength and good plasticity of steel and good electrical conductivity, thermal conductivity, corrosion resistance, and low density of aluminum. Steel-aluminum composite plates are commonly used in subway contact rails in rail transit, vehicle body materials of automobiles and high-speed trains, and bearing shell materials of engines. A variety of heat sinks and cookware made of steel-aluminum composite materials have been launched in the market because of the good thermal conductivity of aluminum. In addition, the steel-aluminum composite plate has a wide application in many fields such as machinery, ships, nuclear energy, and electric power. Especially with the development of smartphones and 5G technology, the steel-aluminum composite plate has also been applied to the production of the smartphone frame because of its unique properties.

However, due to the great difference in material properties (deformation resistance, plasticity, thermal conductivity, melting point, etc.) between steel and aluminum materials, manufacturing a steel-aluminum composite plate is challenging. The current cladding methods mainly include cladding by explosion, brazing, and rolling. Compared with explosion and brazing, cladding by rolling has the advantages of stable quality, simple equipment, easy mass production and automation. However, in the process of rolling to produce a steel/aluminum composite plate, it is difficult to achieve high bonding strength of the final composite plate due to the different properties of steel and aluminum.

SUMMARY OF THE INVENTION

The present invention provides a composite plate for solving the problem of low bonding strength of the composite plate in the prior art.

The present invention provides a composite plate, including:
 a first plate;
 a second plate;
 a first side surface of the first plate is provided with striations, a first side surface of the second plate and the first side surface of the first plate are rolled to connect, and the striations of which adjacent striations have a pitch of 0.005 mm to 0.03 mm account for more than 90% of all the striations.

According to the composite plate provided in an embodiment of the present invention, the striations of which adjacent striations have a pitch of 0.01 mm to 0.02 mm account for more than 90% of all the striations.

According to the composite plate provided in an embodiment of the present invention, the striations of which adjacent striations have a pitch of 0.01 mm to 0.02 mm account for more than 80% of all the striations.

According to the composite plate provided in an embodiment of the present invention, the striations of which adjacent striations have a pitch of 0.01 mm to 0.02 mm account for more than 70% of all the striations.

According to the composite plate provided in an embodiment of the present invention, the striations of which adjacent striations have a pitch of 0.01 mm to 0.02 mm account for more than 50% of all the striations.

According to the composite plate provided in an embodiment of the present invention, the first side surface of the first plate has a roughness of 0.8 Ra to 4.0 Ra.

According to the composite plate provided in an embodiment of the present invention, the first side surface of the second plate has a roughness of 4 Ra to 10 Ra.

According to the composite plate provided in an embodiment of the present invention, the first plate has a greater hardness than the second plate.

According to the composite plate provided in an embodiment of the present invention, the first plate is a titanium plate, and the second plate is an aluminum plate.

According to the composite plate provided in an embodiment of the present invention, the composite plate has a shear strength $\tau=a*b*K1*K2*\sigma_{soft}$, a is a length of the first plate, b is a width of the first plate, K1 is a roughened area ratio of the first plate, and a value range of K1 is 1.5 to 3; K2 is a degree of bonding between the first plate and the second plate, a value range of K2 is 0.15 to 0.3, and when K1*K2>1, a product of K1 and K2 takes a value of 1; $\sigma_{soft}$ is a yield strength of the second plate, and a value range of $\sigma_{soft}$ is 350 MPa to 412 MPa.

According to the composite plate provided in an embodiment of the present invention, the first plate has an elongated shape, and a length direction of the striations and a width direction of the first plate is at a preset angle.

The present invention also provides a composite plate roughening device, including:
 a roughening device, including a machine body, a first driving member and at least one roughening friction roller, wherein the roughening friction roller is rotatably disposed on the machine body and configured for rubbing the first side surface of the first plate or the first side surface of the second plate, and there is a preset angle between an axis of the roughening friction roller and a first direction; the first driving member is connected to the roughening friction roller and is configured for driving the roughening friction roller to rotate axially.

According to the composite plate roughening device provided in an embodiment of the present invention, the roughening friction roller includes a steel wire brush roller or a grinding wheel.

According to the composite plate roughening device provided in an embodiment of the present invention, a mesh number of the grinding belt is 40 to 120, the linear speed of the grinding belt: 9-10 m/S, the speed of the first plate is 4-6 m/min, the overlapping amount of the grinding belt is 0.02 mm, the material of the grinding belt support roller is rubber, the hardness is HS60-75.

According to the composite plate roughening device provided in an embodiment of the present invention, the roughening device further includes:

a dedusting component including a dedusting roller and a second driving member, wherein the dedusting roller is rotatably disposed on the machine body, the roughening friction roller and the dedusting roller are successively arranged and spaced apart in a second direction, and a support roller rotatably connected to the machine body is provided above each of the roughening friction roller and the dedusting roller; the second driving member is connected to the dedusting roller and is configured for driving the dedusting roller to rotate axially.

According to the composite plate roughening device provided in an embodiment of the present invention, the dedusting component further includes:

a dust collector provided at an outer periphery of at least one of the roughening friction roller and the dedusting roller; and an air jet port provided on the machine body on a side of the dedusting roller facing away from the roughening friction roller.

According to the composite plate roughening device provided in an embodiment of the present invention, the roughening device further includes:

a housing, wherein the machine body is disposed inside the housing, partitions are arranged at intervals inside the housing to divide an interior of the housing into a plurality of chambers, and the roughening friction roller and the dedusting roller are respectively positioned in corresponding chambers.

According to the composite plate roughening device provided in an embodiment of the present invention, the roughening device further includes:

a lifting component connected to the roughening friction roller and configured for changing a height of the roughening friction roller.

According to the composite plate roughening device provided in an embodiment of the present invention, the roughening device further includes:

a detection device, including a control terminal, a controller, and a camera for acquiring number of striations per unit area of the first side surface of the first plate or the first side surface of the second plate; wherein the controller is electrically connected to the lifting component and is configured for controlling the lifting component to start and stop; the control terminal is electrically connected to the controller and the camera, respectively, and configured for determining that the number of striations per unit area of the first side surface of the first plate or the first side surface of the second plate is greater than a corresponding preset value or determining that the number of striations per unit area of the first side surface of the first plate or the first side surface of the second plate is smaller than the corresponding preset value, and controlling the lifting component to increase the height of the roughening friction roller.

According to the composite plate roughening device provided in an embodiment of the present invention, the roughening device further includes:

an unwinding device, provided on a side of the roughening friction roller facing away from the dedusting roller; and a tension control device, provided on a side of the dedusting roller facing away from the roughening friction roller and configured for driving the first plate or the second plate to move in the second direction.

The present invention also provides a method for manufacturing a composite plate, including steps of:

rubbing the first side surface of at least one of the first plate and the second plate with the roughening friction roller to form the striations; and rolling the first plate and the second plate asynchronously to obtain the composite plate.

According to the method for manufacturing a composite plate provided in an embodiment of the present invention, the roughening friction roller (3) comprises a grinding belt, a mesh number of the grinding belt is 40 to 120, a pressure applied when the grinding wheel works is 0.1 MPa to 0.5 MPa, the linear speed of the grinding belt: 9-10 m/S, the speed of the first plate is 4-6 m/min, the overlapping amount of the grinding belt is 0.02 mm, the material of the grinding belt support roller is rubber, the hardness is HS60-75.

According to the method for manufacturing a composite plate provided in an embodiment of the present invention, the striations of which adjacent striations have a pitch of 0.005 mm to 0.03 mm account for more than 90% of all the striations.

According to the method for manufacturing a composite plate provided in an embodiment of the present invention, before rolling the first plate and the second plate asynchronously, the method further includes:

removing debris from a surface of at least one of the first plate and the second plate.

According to the method for manufacturing a composite plate provided in an embodiment of the present invention, after removing debris from a surface of at least one of the first plate and the second plate, the method further includes:

acquiring the number of striations per unit area of the first side surface of the first plate or the first side surface of the second plate;

determining that the number of striations per unit area of the first side surface of the first plate or the first side surface of the second plate is smaller than the corresponding preset value, and controlling the lifting component to increase the height of the roughening friction roller.

According to the method for manufacturing a composite plate provided in an embodiment of the present invention, the step of rolling the first plate and the second plate asynchronously includes:

heating the second plate;

rolling the heated first plate and the heated second plate asynchronously so that the first side surface of the second plate and the first side surface of the first plate are rolled to connect and produce the composite plate.

According to the method for manufacturing a composite plate provided in an embodiment of the present invention, after rolling the heated first plate and the heated second plate asynchronously, the method further includes:

subjecting the composite plate to a solid solution treatment; and subjecting the composite plate to an aging treatment after the solid solution treatment.

According to the method for manufacturing a composite plate provided in an embodiment of the present invention, the solid solution treatment is performed at 250° C. to 480° C. for 45 min to 65 min; the aging treatment is performed at 160° C. to 200° C. for 5 h to 7 h.

According to the method for manufacturing a composite plate provided in an embodiment of the present invention, the first plate and the second plate feature a thickness ratio of 1.5:1.0; a differential speed ratio of the roller corresponding to the first plate to the roller corresponding to the second plate is 1:1.05, and a reduction rate of the asynchronous rolling is 20% to 40%.

Embodiments of the present invention provide a composite plate, which is formed by roughening the first side surface of the first plate such that the first side surface of the first plate and/or the first side surface of the second plate form striations, which increases the area of the first plate and the second plate subjected to rolling, hence the composite plate produced by combining the first plate and the second plate has a higher bonding strength and thus a stronger bonding.

BRIEF DESCRIPTION OF THE DRAWINGS

To explain the technical solutions of the present invention or the prior art more clearly, the following will briefly introduce the drawings necessary for the description of the embodiments or the prior art. Apparently, the drawings in the following description illustrate only some embodiments of the present invention, other drawings may be obtained by those of ordinary skills in the art based on these drawings without inventive work.

Figure 1:
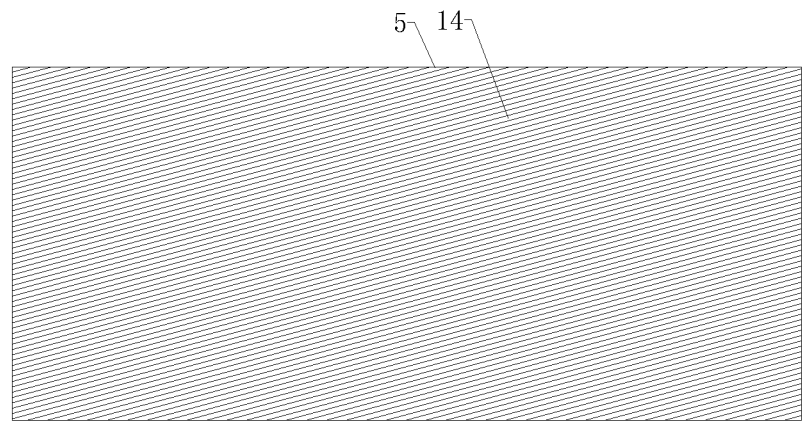
FIG. 1 is a schematic view showing a structure of a first plate according to an embodiment of the present invention.

Reference signs: 1. unwinding device; 2. camera; 3. roughening friction roller; 4. dedusting roller; 5. first plate; 6. chamber; 7. partition; 8. control terminal; 9. controller; 10. lifting component; 11. support roller; 12. dust collector; 13. air jet port; 14. striation; 15. tension control device; 16. second plate.

DETAILED DESCRIPTION OF THE INVENTION

The implementation of the present invention will be described in further detail below in conjunction with the accompanying drawings and embodiments. The following embodiments illustrate the present invention, without limiting the scope of the present invention.

In the description of the embodiments of the present invention, it should be noted that such terms as "center", "longitudinal", "transverse", "upper", "lower", "front", "rear", "left", "right", "vertical", "horizontal", "top", "bottom", "inner", "outer" and others indicating directional or positional relations are based on the positions or positional relations shown in the drawings, intended only to facilitate the description rather than indicate or imply that the device or element must have a specific orientation or must be constructed and operated in a specific orientation, and therefore cannot be understood as limiting the embodiments of the present invention. In addition, such terms as "first", "second", and "third" are only used for descriptive purposes, and cannot be understood as indicating or implying relative importance.

In the description of the embodiments of the present invention, it should be noted that, unless otherwise clearly specified and defined, such terms as "connection" and "coupling" should be understood in a broad sense. For example, the connection may be a fixed connection, a detachable connection, or integral connection; mechanical connection or electrical connection; direct connection or indirect connection through an intermediate. For those of ordinary skill in the art, the specific meanings of the above-mentioned terms in the embodiments of the present invention can be interpreted depending on specific situations.

In the embodiments of the present invention, unless otherwise clearly defined and specified, a first feature being "on" or "under" a second feature may include direct contact between the first and second features, or indirect contact through an intermediate. Moreover, the first feature being "on", "above" and "over" the second feature may indicate that the first feature is directly above or obliquely above the second feature, or simply the level of the first feature is higher than that of the second feature. The first feature being "below", "under" and "beneath" the second feature may indicate that the first feature is directly below or obliquely below the second feature, or simply the level of the first feature is lower than the second feature.

In the description of this specification, descriptions with reference to such terms as "one embodiment", "some embodiments", "examples", "specific examples", or "some examples" indicate that specific features, structures, materials, or characteristics described in conjunction with the embodiment or example are included in at least one embodiment or example of the embodiments of the present invention. In this specification, the schematic representations of the above-mentioned terms do not necessarily refer to the same embodiment or example. Moreover, the described specific features, structures, materials, or characteristics can be combined in any one or more embodiments or examples as appropriate. In addition, those skilled in the art can combine different embodiments or examples and the features of the different embodiments or examples described in this specification without contradicting each other.

A composite plate, a composite plate roughening device, and a method for manufacturing a composite plate according to embodiments of the present invention will be described with reference to FIGS. 1 to 6.

Figure 2:
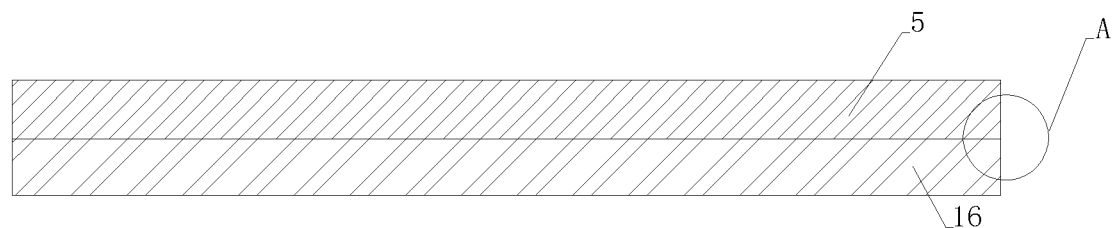
FIG. 2 is a schematic cross-sectional view showing a structure of a composite plate according to an embodiment of the present invention.
Figure 3:
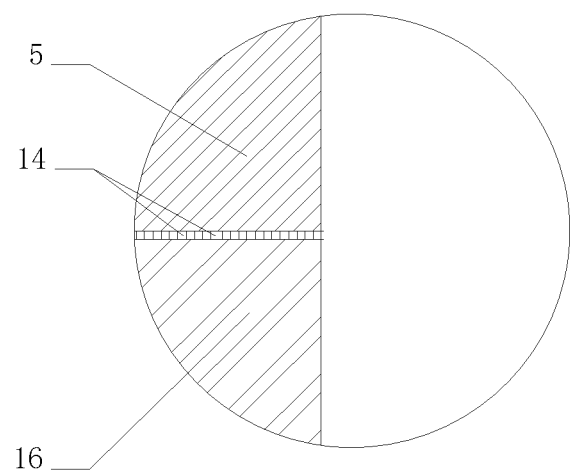
FIG. 3 is a partially enlarged structural view at A in FIG. 2 according to an embodiment of the present invention.

As shown in FIGS. 1 to 3, the composite plate includes a first plate 5 and a second plate 16, a first side surface of the first plate 5 is provided with striations 14, the first side surface of the second plate 16 and a first side surface of the first plate 5 are rolled to connect, and the striations 14 of which adjacent striations 14 have a pitch of 0.005 mm to 0.03 mm account for more than 90% of all the striations. It's tested that a shear strength of the composite plate is between 210 MPa and 245 MPa when the striations 14 of which adjacent striations 14 have a pitch of 0.005 mm to 0.03 mm account for more than 90% of all the striations.

According to the composite plate provided in the embodiment of the present invention, the first side surface of the first plate 5 or the first side surface of the second plate 16 is roughened to provide the first side surface of the first plate 5 or the first side surface of the second plate 16 with the striations 14, and the area of the first plate 5 and the second plate 16 subjected to rolling is increased so that the composite plate produced by combining the first plate 5 and the second plate 16 has a higher bonding strength and thus a stronger bonding.

According to an embodiment of the invention, the striations 14 of which adjacent striations 14 have a pitch of 0.01 mm to 0.02 mm account for more than 90% of all the striations. The more uniform the striations 14 are and the smaller the pitch between two adjacent striations 14 is, the greater the number of the striations 14 per unit area is, the larger the area subjected to rolling of the first plate 5 and the second plate 16 is, and thus the higher the bonding strength is of the composite plate formed by bonding the first plate 5 and the second plate 16. It's tested that the shear strength of the composite plate is between 200 MPa and 230 MPa when the striations 14 of which adjacent striations 14 have a pitch of 0.01 mm to 0.02 mm account for more than 90% of all the striations.

According to an embodiment of the invention, the striations 14 of which adjacent striations 14 have a pitch of 0.01 mm to 0.02 mm account for more than 80% of all the striations. It's tested that a shear strength of the composite plate is between 190 MPa and 225 MPa when the striations 14 of which adjacent striations 14 have a pitch of 0.01 mm to 0.02 mm account for more than 80% of all the striations.

According to an embodiment of the invention, the striations 14 of which adjacent striations 14 have a pitch of 0.01 mm to 0.02 mm account for more than 70% of all the striations. It's tested that a shear strength of the composite plate is between 185 MPa and 220 MPa when the striations 14 of which adjacent striations 14 have a pitch of 0.01 mm to 0.02 mm account for more than 70% of all the striations.

According to an embodiment of the invention, the striations 14 of which adjacent striations 14 have a pitch of 0.01 mm to 0.02 mm account for more than 50% of all the striations. It's tested that a shear strength of the composite plate is between 170 MPa and 210 MPa when the striations 14 of which adjacent striations 14 have a pitch of 0.01 mm to 0.02 mm account for more than 50% of all the striations.

According to an embodiment of the invention, the striations 14 are straight striations, and the straight striations are arranged at intervals, and the pitch between two adjacent striations 14 may be consistent or not.

Herein, it should be noted that the striation 14 of the embodiment of the present invention refers to a groove formed in the first side surface of the first plate 5 and/or the first side surface of the second plate 16, and a depth of the groove is determined by the pressure applied to the roughening friction roller 3 when it works.

According to an embodiment of the present invention, the first plate 5 has an elongated shape, there is a preset angle between a length direction of the striations 14 and a width direction of the first plate 5, and the preset angle in this embodiment may be, but is not limited to, 70° to 82°. The striations 14 of the first plate 5 serve to increase the area of the first plate 5 and the second plate 16 subjected to rolling.

According to an embodiment of the present invention, the first side surface of the second plate 16 is also formed with the striations 14, and there is a preset angle between the length direction of the striations 14 and the width direction of the second plate 16, and the preset angle in this embodiment may be, but is not limited to, 70° to 82°. The preset angle corresponding to the striations 14 of the second plate 16 and the preset angle corresponding to the striations 14 of the first plate 5 may be equal to ensure a better coupling between the first plate 5 and the second plate 16 during rolling. The striations 14 of the second plate 16 are configured for discharging air in the process of rolling to produce the composite plate, and the striations 14 are short because of the preset angle included between the length direction of the striations 14 and the width direction of the second plate 16. Shorter striations 14 facilitate discharging the air between the first plate 5 and the second plate 16 when the first plate 5 and the second plate 16 are rolled, resulting in a higher bonding strength of the composite plate.

According to an embodiment of the present invention, the hardness of the first plate 5 is greater than the hardness of the second plate 16; since the hardness of the second plate 16 is smaller, the second plate 16 is deformed during rolling, and the second plate 16 enters the grooves of the striations 14 of the first plate 5; after the first plate 5 is cooled, the pitch of the striations 14 is reduced, and the second plate 16 is closely attached to the first plate 5 in the grooves of the striations 14, forming an interference fit, thereby bonding the first plate 5 and the second plate 16 tightly.

Herein, HV refers to Vickers hardness in $kg/mm^2$. Vickers hardness is defined as the ratio of a load to an area of indentation formed on a surface of a specimen when a positive tetragonal diamond indenter is pressed into the surface of the specimen with the load and held for a while before unloading the test force.

According to the embodiment of the present invention, the first plate 5 is a titanium plate, and the second plate 16 is an aluminum alloy plate; however, the materials of the first plate 5 and the second plate 16 are not limited thereto, and can be selected as appropriate. Herein, the titanium plate may be a titanium plate containing various alloy components and a titanium plate containing various non-metal elements, or a titanium plate with various metallographic structures; certainly, the first plate 5 may also be a steel plate coated with a plating layer on a surface; the aluminum alloy plate may be an aluminum alloy plate containing various alloys and various proportions of components.

According to the embodiment of the present invention, the hardness of the first plate 5 is HV 270 to HV 330, the roughness of the first side surface of the first plate 5 is 0.8 Ra to 4.0 Ra, the roughness of the first side surface of the second plate 16 is 4 Ra to 10 Ra, where Ra is an arithmetic average roughness. With the first plate 5 with a higher hardness subjected to the cladding process, the hardness of the composite plate is effectively improved, thereby satisfying the requirements of manufacturing a cell phone frame.

According to an embodiment of the present invention, the shear strength of the composite plate is $\tau = a*b*K1*K2*\sigma_{soft}$, wherein a is a length of the first plate 5, b is a width of the first plate 5, K1 is a roughened area ratio of the first plate 5, and a value range of K1 is 1.5 to 3; K2 is a degree of bonding between the first plate 5 and the second plate 16, a value range of K2 is 0.15 to 0.3, and when K1*K2>1, a product of K1 and K2 takes a value of 1; $\sigma_{soft}$ is a yield strength of the second plate 16, and a value range of $\sigma_{soft}$ is 350 MPa to 412 MPa. MPa is the unit of pressure, M denotes Mega, and Pa denotes Pascal.

A specific embodiment of the invention is described below in connection with FIGS. 1, 2 and 3. In FIGS. 1 and 2, the composite plate includes the first plate 5, which is a titanium plate, and the second plate 16, which is an aluminum alloy plate. The first side surface of the titanium plate is provided with the striations 14, wherein the striations 14 are straight striations arranged at intervals. The striations 14 of which adjacent ones have a pitch of 0.02 mm account for more than 90% of all the striations 14. The titanium plate has an elongated shape, an angle of 78° is included between the length direction of the striations 14 and the width direction of the titanium plate, the hardness of the titanium plate is HV 300, and the roughness of the first side surface of the titanium plate is 2 Ra.

The first side surface of the aluminum alloy plate is also provided with the striations 14, and a thickness ratio of the titanium plate to the aluminum alloy plate is 1.5:1.0. The striations 14 of the aluminum alloy plate are also straight striations arranged at intervals. The striations 14 of which adjacent ones have a pitch of 0.02 mm account for more than 90% of all the striations 14. The aluminum alloy plate has an elongated shape, an angle of 78° is included between the length direction of the striations 14 and the width direction of the aluminum alloy plate, and the roughness of the first side surface of the aluminum alloy plate is 3 Ra.

The first side surface of the aluminum alloy plate and the first side surface of the titanium plate are rolled to connect and form the composite plate, wherein the shear strength of the composite plate is $\tau=a*b*K1*K2*\sigma_{soft}$, a is the length of the titanium plate, b is the width of the titanium plate, K1 is the roughened area ratio of the titanium plate, and K1 takes a value of 2; K2 is the degree of bonding between the titanium plate and the aluminum alloy plate, and K2 takes a value of 0.2; when $K1*K2>1$, the product of K1 and K2 is 1; $\sigma_{soft}$ is the yield strength of aluminum alloy plate, and $\sigma_{soft}$ takes a value of 380 MPa.

Embodiments of the present invention provide a composite plate in which the first side surface of the first plate 5 and/or the first side surface of the second plate 16 are roughened so that the first side surface of the first plate 5 and/or the first side surface of the second plate 16 are provided with the striations 14 to increase the area of the first plate 5 and the second plate 16 subjected to rolling, hence the composite plate produced after the first plate 5 and the second plate 16 are combined has a higher bonding strength and thus a stronger bonding. The composite plate produced by rolling according to the embodiment of the present invention has a high shear forth and features a strong bonding, which satisfies the design requirement. The resulting composite plate has a strong bonding strength and is suitable to be machined as a cell phone frame, in which case, it satisfies the requirement of minimal signal shielding for a cell phone and a low ratio of strength to weight.

Figure 4:
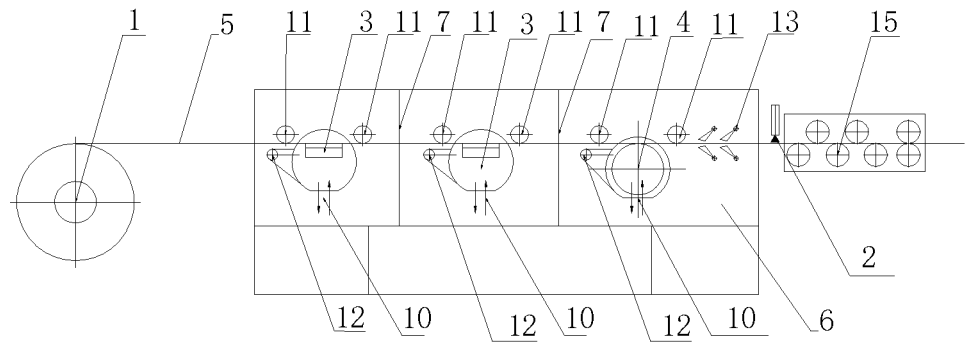
FIG. 4 is a first schematic view showing a structure of a composite plate roughening device according to an embodiment of the present invention.
Figure 5:
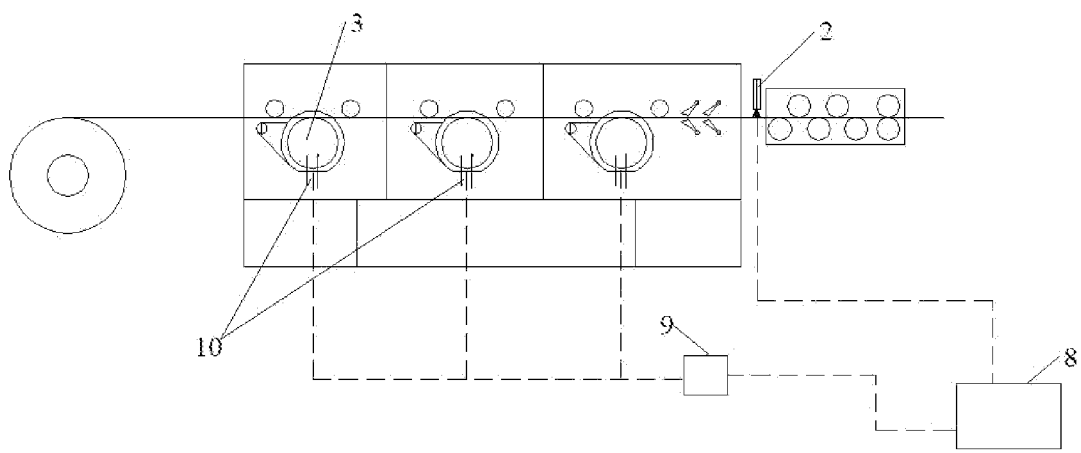
FIG. 5 is a second schematic view showing a structure of the composite plate roughening device according to an embodiment of the present invention.

The present invention also provides a composite plate roughening device, as shown in FIGS. 4 and 5, for use in the manufacture of the composite plate according to any of the embodiments described above. The composite plate roughening device includes a roughening device, the roughening device includes a machine body, a first driving member and at least one roughening friction roller 3 rotatably disposed on the machine body, and the roughening friction roller 3 is configured for rubbing the first side surface of the first plate 5 or the first side surface of the second plate 16. There is a preset angle between an axis of the roughening friction roller 3 and a first direction, and the preset angle is 70° to 90° in this embodiment. The first driving member is configured for driving the roughening friction roller 3 to rotate axially, and the first driving member includes a first motor and a first transmission member, wherein a rotating shaft of the first motor is connected to the roughening friction roller 3 via the first transmission member, the first transmission member can be a combination of a belt and a pulley, a combination of a gear and a chain, or a combination of a plurality of gears, and the specific structure of the first transmission member is not limited by examples herein, as long as the roughening friction roller 3 can be driven to rotate.

Herein, it should be noted that as shown in FIG. 4, a second direction is a left-right direction in FIG. 4, and the first direction is a front-rear direction in FIG. 4. When the roughening device works, the first plate 5 or the second plate 16 moves in the second direction and comes into contact with the roughening friction roller 3, and the rotating roughening friction roller 3 rubs the first side surface of the first plate 5 or the first side surface of the second plate 16, so that the first side surface of the first plate 5 or the first side surface of the second plate 16 is provided with the striations 14.

According to an embodiment of the present invention, the roughening friction roller 3 includes a grinding belt with a mesh number of 40 to 120, the linear speed of the grinding belt: 9-10 m/S, the speed of the first plate is 4-6 m/min, the overlapping amount of the grinding belt is 0.02 mm, the material of the grinding belt support roller is rubber, the hardness is HS60-75. The pressure applied to the grinding belt when it works determines the depth and number of the striations 14, and the mesh number of the grinding belt determines the width of the striation 14.

According to an embodiment of the present invention, the roughening device further includes a dedusting component, the dedusting component includes a dedusting roller 4 rotatably disposed on the machine body and having an axis extending in the first direction, and a second driving member. The roughening friction roller 3 and the dedusting roller 4 are successively arranged at intervals along the second direction, two support rollers 11 rotatably connected to the machine body are disposed above each of the roughening friction roller 3 and the dedusting roller 4, and the two support rollers 11 are spaced apart. The support roller 11 is configured for cooperating with the roughening friction roller 3 and the dedusting roller 4, so as to limit the first plate 5 or the second plate 16 subjected to the roughening treatment, and ensure that the roughening friction roller 3 and the dedusting roller 4, respectively, have good contact with the plate. The second driving member is configured for driving the dedusting roller 4 to rotate axially and includes a second motor and a second transmission member, and a rotating shaft of the second motor is connected to the dedusting roller 4 via the second transmission member. The second transmission member may be a combination of a belt and a pulley, a combination of a gear and a chain, or a combination of a plurality of gears. The dedusting roller 4 is a brush roller to remove debris from the surface of the first plate 5 or the second plate 16 upon contact with the first side surface of the first plate 5 or the first side surface of the second plate 16.

In the working process of the roughening device, the first side surface of the first plate 5 or the first side surface of the second plate 16 is roughened by the roughening friction roller 3, and then the debris is removed from the surface of the first plate 5 or the second plate 16 by the dedusting roller 4, so as to ensure that the roughened surface of the first plate 5 or the roughened second plate 16 is clean, and then the subsequent work such as rolling is performed.

Herein, it should be noted that only one dedusting roller 4 is provided in this embodiment, but two or more dedusting rollers 4 may be provided as appropriate. The debris includes, but is not limited to, metal debris and dust, but may be other substances.

According to an embodiment of the present invention, the dedusting component further includes a dust collector 12 provided at an outer periphery of at least one of the roughening friction roller 3 and the dedusting roller 4, and air jet ports 13. The dust collector 12 is connected to a negative pressure device via a pipeline, and the dust collector 12 can suck up the dust near the roughening friction roller 3 and the dedusting roller 4 to prevent air pollution. The air jet ports 13 are disposed in the machine body on a side of the dedusting roller 4 facing away from the roughening friction roller 3. The air jet port 13 is connected to an air supply device via a pipeline, and the air supply device provides a high-speed air flow to the air jet ports 13. In this embodiment, the air jet ports 13 are arranged in two rows up and down, and the two rows of air jet ports 13 are spaced at a certain distance to facilitate the passage of the first plate 5 or the second plate 16. When the first plate 5 or the second plate 16 passes through the space between the upper and lower rows of air jet ports 13, the air jet ports 13 jet a high-speed air flow to the first plate 5 or the second plate 16 to remove debris from the surface of the first plate 5 or the second plate 16 and ensure a clean surface of the first plate 5 or the second plate 16 so that the camera 2 can capture a clear image, facilitating subsequent rolling and other processes.

According to an embodiment of the present invention, the roughening device further includes a housing, wherein the machine body is disposed inside the housing, partitions 7 are arranged at intervals inside the housing to divide the interior of the housing into a plurality of chambers 6, and the roughening friction roller 3 and the dedusting roller 4 are respectively positioned in corresponding chambers 6. The partition 7 between two adjacent chambers 6 is provided with through holes (not shown) which facilitate the passage of the first plate 5 or the second plate 16. Because of the partitions 7 inside the housing, the interior of the housing is divided into a plurality of smaller chambers 6, which enhances the dedusting effect of the dust collector 12.

According to an embodiment of the present invention, the roughening device further includes a lifting component 10 connected to the roughening friction roller 3 for changing the height of the roughening friction roller 3. The outer diameter of the roughening friction roller 3 is reduced if the roughening friction roller 3 rubs the first plate 5 or the second plate 16 for a period of time, so the number of striations 14 formed in the roughening process falls short of the design requirement. Therefore, it is necessary to increase the height of the roughening friction roller 3 by the lifting component 10 so that the roughening friction roller 3 is in full contact with the first side surface of the first plate 5 or the first side surface of the second plate 16. In this embodiment, the lifting component 10 is a lead screw component composed of a servo motor and a lead screw, a sliding block of the lead screw component is connected to the roughening friction roller 3, and the servo motor drives the lead screw to rotate, thereby pushing the roughening friction roller 3 to slide up and down and then changing the height of the roughening friction roller 3. Certainly, the type of the lifting component 10 is not limited thereto, as long as the roughening friction roller 3 can be driven.

According to an embodiment of the present invention, the composite plate roughening device further includes a detection device, and the detection device includes a control terminal 8, a controller 9, and a camera 2. The camera 2 is positioned below the first plate 5 or the second plate 16, and the camera 2 faces towards the first side surface of the first plate 5 or the first side surface of the second plate 16, that is, the camera 2 is oriented upwards. The camera 2 is configured to acquire image information of the first side surface of the first plate 5 or the first side surface of the second plate 16. The controller 9 is electrically connected to the lifting component 10, and the controller 9 is configured for controlling the lifting component 10 to start and stop. The control terminal 8 is electrically connected to the controller 9 and the camera 2, respectively, and the control terminal 8 is configured for determining that the number of striations per unit area of the first side surface of the first plate 5 or the first side surface of the second plate 16 is greater than a corresponding preset value or determining that the number of striations per unit area of the first side surface of the first plate 5 or the first side surface of the second plate 16 is smaller than the corresponding preset value, and controlling the lifting component 10 to increase the height of the roughening friction roller 3.

According to an embodiment of the present invention, the composite plate roughening device further includes an unwinding device 1 provided at a side of the roughening friction roller 3 facing away from the dedusting roller 4 for winding the first plate 5 or the second plate 16 and releasing the first plate 5 or the second plate 16 under the traction of the driving component, and a tension control device 15. The tension control device 15 is provided on the side of the dusting roller 4 facing away from the roughening friction roller 3, and the tension control device 15 is configured for driving the first plate 5 or the second plate 16 to move in the second direction and to tension it as appropriate. The tension control device 15 is composed of plurality of cylindrical bars and a driving motor, wherein the driving motor is connected to the cylindrical bars, the first plate 5 or the second plate 16 is clamped between the cylindrical bars and driven to move along the second direction by rotating the cylindrical bars. Driven by the tension control device 15, the first plate 5 or the second plate 16 is released from the unwinding device 1 with a preset tension and sequentially passes through the roughening friction roller 3 and the dedusting roller 4.

An embodiment of the invention is described below in connection with FIGS. 4 and 5. In FIGS. 4 and 5, the composite plate roughening device includes the roughening device, the detection device, the unwinding device 1, and the tension control device 15, wherein the unwinding device 1, the roughening device and the tension control device 15 are successively arranged along the second direction, namely, the unwinding device 1 is positioned left to the roughening device, and the tension control device 15 is positioned right to the roughening device.

The roughening device includes the machine body, the first driving member, two roughening friction rollers 3, the dedusting component, the housing, and the lifting component 10, wherein the machine body is disposed inside the housing, the two roughening friction rollers 3 are rotatably disposed on the machine body, the roughening friction rollers 3 are configured for rubbing the first side surface of the first plate 5 or the first side surface of the second plate 16, there is a preset angle between the axis of the roughening friction rollers 3 and the first direction, and the preset angle is 80° in this embodiment. The first driving member includes the first motor and the first transmission member, wherein the rotating shaft of the first motor passes through the first transmission member and the roughening friction roller 3, and the first transmission member can be a combination of a belt and a pulley, a combination of a gear and a chain, or a combination of a plurality of gears.

The dedusting component includes the dedusting roller 4, the second driving member, the dust collector 12 and the air jet port 13, the dedusting roller 4 being rotatably disposed in the machine body, the axis of the dedusting roller 4 extending in the first direction. The roughening friction roller 3 and the dedusting roller 4 are successively arranged at intervals in the second direction, and the dedusting roller 4 is positioned right to two roughening friction rollers 3. Two support rollers 11 rotatably connected to the machine body are disposed above each of the roughening friction roller 3 and the dedusting roller 4, and the two support rollers 11 are spaced apart. The support roller 11 cooperates with the roughening friction roller 3 and the dedusting roller 4 to limit the first plate 5 or the second plate 16 and ensure that the roughening friction roller 3 and the dedusting roller 4 are in good contact with the plate, respectively. The second driving member is configured for driving the dedusting roller 4 to rotate axially and includes the second motor and the second transmission member, wherein the rotating shaft of the second motor is connected to the dedusting roller 4 via the second transmission member, and the second transmission member can be a combination of a belt and a pulley, a combination of a gear and a chain, or a combination of a plurality of gears. The dedusting roller 4 is a brush roller that removes debris from the surface of the first plate 5 and/or the second plate 16 by contacting the first side surface of the first plate 5 or the first side surface of the second plate 16.

When working, the roughening device roughens the first side surface of the first plate 5 or the first side surface of the second plate 16 with the roughening friction roller 3, and then removes the debris from the surface of the first plate 5 or the second plate 16 with the dedusting roller 4, so as to ensure that the surface of the first plate 5 or the second plate 16 after roughening is clean, and then the subsequent work such as rolling is performed.

Three dust collectors 12 are provided, wherein two dust collectors 12 are disposed on the periphery of the roughening friction roller 3, and the other dust collector 12 is disposed on the periphery of the dedusting roller 4; the dust collectors 12 are connected to the negative pressure device via a pipeline; the dust collectors 12 can suck up dust near the roughening friction roller 3 and the dedusting roller 4 to prevent air pollution.

A plurality of air jet ports 13 are provided, and the air jet ports 13 are provided in the machine body on a side of the dedusting roller 4 facing away from the roughening friction roller 3, namely, the air jet ports 13 are positioned right to the dedusting roller 4. The air jet port 13 is connected to the air supply device via a pipeline, and the air supply device provides a high-speed air flow to the air jet port 13. In this embodiment, the air jet ports 13 are arranged in two rows up and down, and the two upper and lower rows of air jet ports 13 are spaced apart at a certain distance so as to facilitate the passage of the first plate 5 or the second plate 16. When the first plate 5 or the second plate 16 passes through space between the upper and lower rows of air jet ports 13, the air jet ports 13 jet a high-speed air flow to the first plate 5 or the second plate 16 to further remove debris from the surface of the first plate 5 or the second plate 16 and ensure that the surface of the first plate 5 or the second plate 16 is clean and the camera 2 can capture a clear image, and thus avoid the influence on rolling the first plate 5 and the second plate 16.

Two partitions 7 are arranged at intervals inside the housing to divide the interior of the housing into three chambers 6, two roughening friction rollers 3 are disposed in two chambers 6 in a one-to-one correspondence, and the dedusting roller 4 is disposed in the other chamber 6. The partition 7 between two adjacent chambers 6 is provided with through holes to facilitate the passage of the first plate 5 and the second plate 16. With the partitions 7 that divide the interior of the housing into a plurality of smaller chambers 6, the dedusting effect of the dust collector 12 is enhanced.

The lifting component 10 is connected to the roughening friction roller 3 for changing the height of the roughening friction roller 3. The brush filament will be worn after the first side surface of the first plate 5 or the first side surface of the second plate 16 are treated by the roughening friction roller 3 for a period of time, and the outer diameter of the roughening friction roller 3 is reduced, as a result, the number of the striations 14 generated by the roughening treatment cannot falls short of the design requirement. Therefore, it is necessary to increase the height of the roughening friction roller 3 with the lifting component 10 so that the roughening friction roller 3 is in full contact with the first side surface of the first plate 5 or the first side surface of the second plate 16. In this embodiment, the lifting component 10 is a lead screw component composed of a servo motor and a lead screw, a sliding block of the lead screw component is connected to the roughening friction roller 3, and the servo motor drives the lead screw to rotate, thereby pushing the roughening friction roller 3 to slide up and down and changing the height of the roughening friction roller 3. Certainly, the lifting component 10 is not limited this type, and other types are possible.

The detection device includes the control terminal 8, the controller 9, and the camera 2, wherein the camera 2 is positioned below the first plate 5 or the second plate 16 and faces the first side surface of the first plate 5 or the first side surface of the second plate 16, and the camera 2 is configured for acquiring image information about the first side surface of the first plate 5 or the first side surface of the second plate 16. The controller 9 is electrically connected to the lifting component 10 and configured for controlling the lifting component 10 to start and stop. The control terminal 8 is electrically connected to the controller 9 and the camera 2, respectively, and configured for determining that the number of striations per unit area of the first side surface of the first plate 5 or the first side surface of the second plate 16 is greater than a corresponding preset value, or determining that the number of striations per unit area of the first side surface of the first plate 5 or the first side surface of the second plate 16 is smaller than the corresponding preset value, and controlling the lifting component 10 to increase the height of the roughening friction roller 3.

The unwinding device 1 is provided on a side of the roughening friction roller 3 facing away from the dedusting roller 4 and configured for winding the first plate 5 or the second plate 16 and releasing the first plate 5 or the second plate 16 under the traction of the tension control device 15.

The tension control device 15 is provided on a side of the dedusting roller 4 facing away from the roughening friction roller 3, the tension control device 15 is provided right to the dedusting roller 4 and configured for driving the first plate 5 or the second plate 16 to move in the second direction. The tension control device 15 is composed of a plurality of cylindrical bars and a driving motor, wherein the driving motor is connected to the cylindrical bars, the first plate 5 or the second plate 16 is clamped between the cylindrical bars and driven to move in the second direction by rotating the cylindrical bars. Driven by the tension control device 15, the first plate 5 or the second plate 16 is released from the unwinding device 1 with a preset tension, and the roughening friction roller 3 can be brought into good contact with the first plate 5 or the second plate 16 by tensioning the first plate 5 or the second plate 16.

The composite plate roughening device provided in the embodiment of the present invention roughens the first side surface of the first plate 5 so that the first side surface of at least one of the first plate 5 and the second plate 16 is provided with the striations 14, which increases the area of the first plate 5 and the second plate 16 subjected to rolling, hence the composite plate produced by rolling the first plate 5 and the second plate 16 has a higher bonding strength and thus a stronger bonding. The composite plate produced with the composite plate roughening device of the present invention has a high shear force and features a tight bonding, which satisfies the design requirement. The resulting composite plate has a strong bonding strength and is suitable to be machined as a cell phone frame, and it satisfies the requirement of minimal signal shielding for a cell phone and a low ratio of strength to weight.

Figure 6:
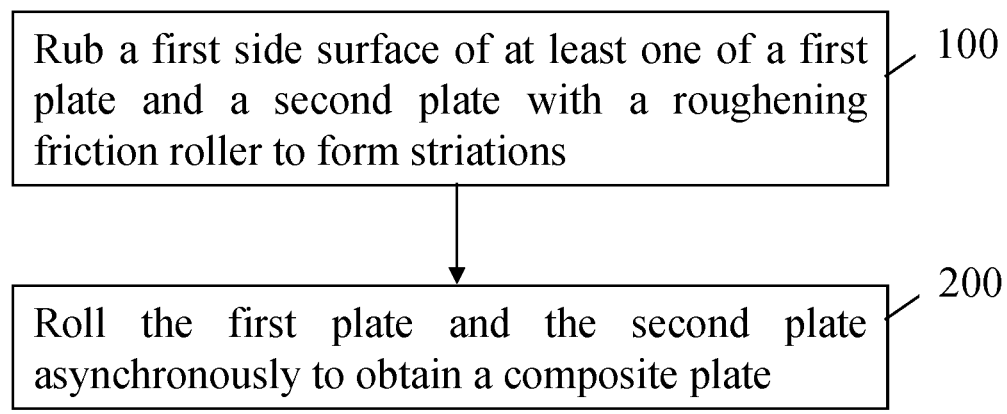
FIG. 6 is a schematic flow chart of a method for manufacturing a composite plate according to an embodiment of the present invention.

The present invention also provides a method for manufacturing the composite plate according to any of the above embodiments. As shown in FIG. 6, the method for manufacturing the composite plate includes the steps as follows.

Step 100, the first side surface of at least one of the first plate 5 and the second plate 16 is rubbed by the roughening friction roller 3 to form the striations 14;

the roughening process is to form groove-like straight striations in the first side surface of at least one of the first plate 5 and the second plate 16.

In the process of contacting with the first side surface of the first plate 5 or the first side surface of the second plate 16, the roughening friction roller 3 rubs to form the striations 14; the roughening friction roller 3 rotates at a constant speed, and the first plate 5 and the second plate 16 move at a constant speed in the second direction, so the striations 14 formed in the first side surface of the first plate 5 and the first side surface of the second plate 16 are straight striations arranged at intervals, and there is a preset angle between the straight striations and the width direction of the first plate 5 or the second plate 16. The striations 14 of which adjacent ones have a pitch of 0.005 to 0.03 mm account for more than 90% of all the striations 14. The roughening treatment may be performed once, or may be performed two or more times.

Step 200, the first plate 5 and the second plate 16 are asynchronously rolled to obtain the composite plate.

In this embodiment, both the first side surface of the first plate 5 and the first side surface of the second plate 16 are subjected to the roughening treatment, although only the first side surface of the first plate 5 may be subjected to the roughening treatment.

The roughening friction roller includes the grinding w belt heel, the linear speed of the grinding belt: 9-10 m/S, the speed of the first plate is 4-6 m/min, the overlapping amount of the grinding belt is 0.02 mm, the material of the grinding belt support roller is rubber, the hardness is HS60-75.

According to an embodiment of the invention, the striations of which adjacent striations have a pitch of 0.005 mm to 0.03 mm account for more than 90% of all the striations.

According to an embodiment of the present invention, before rolling the first plate 5 and the second plate 16 asynchronously, the method further includes:

step 110, removing debris from a surface of at least one of the first plate 5 and the second plate 16.

Debris on the surface of the first plate 5 or the second plate 16 can be removed during the rotation of the dedusting roller 4; when the first plate 5 or the second plate 16 moves to a position between the upper and lower rows of the air jet ports 13, the air jet ports 13 emit a high-speed air flow to the first plate 5 or the second plate 16 to further remove debris from the surface of the first plate 5 or the second plate 16 and ensure that the surface of the first plate 5 or the second plate 16 is clean and the camera 2 can capture a clear image, and thus avoid the influence on combining the first plate 5 and the second plate 16.

According to an embodiment of the present invention, after the step of removing the debris from the surface of at least one of the first plate 5 and the second plate 16, the method further includes:

step 120, acquiring the number of striations per unit area of the first side surface of the first plate 5 or the first side surface of the second plate 16;

acquiring, by the camera 2, image information of the first side surface of the first plate 5 or the first side surface of the second plate 16, and transmitting the image information to the control terminal 8.

In step 130, the number of striations per unit area of the first side surface of the first plate 5 or the first side surface of the second plate 16 is determined to be smaller than a corresponding preset value, and the lifting component 10 is controlled to increase the height of the roughening friction roller 3.

When the control terminal 8 determines that the number of striations per unit area of the first side surface of the first plate 5 or the first side surface of the second plate 16 is smaller than the corresponding preset value, the control terminal 8 sends a control instruction to the controller 9, and the controller 9 controls the lifting component 10 to rise according to the control instruction, thereby increasing the height of the roughening friction roller 3 and bringing the roughening friction roller 3 into close contact with the first side surface of the first plate 5 or the first side surface of the second plate 16.

The number of striations per unit area of the first side surface of the first plate 5 or the first side surface of the second plate 16 is determined to be greater than the corresponding preset value. The control terminal 8 calculates the number of striations per unit area according to the acquired image information, and if the number of striations per unit area of the first side surface of the first plate 5 or the first side surface of the second plate 16 is determined to be greater than the corresponding preset value, then the roughening friction roller 3 is in good contact with the first side surface of the first plate 5 or the first side surface of the second plate 16, without the need to increase the height of the roughening friction roller 3.

According to an embodiment of the invention, the step of rolling the first plate 5 and the second plate 16 asynchronously includes:

step 210, heating the second plate 16, wherein an online heating method is used, specifically, an eddy current heating method is employed to heat the second plate 16 to 250° C. By means of online heating, the first side surface of the first plate 5 and the first side surface of the second plate 16 can be rolled to combine in a semi-molten state to further improve the bonding strength of the composite plate.

The asynchronous rolling in the embodiment of the present invention refers to rolling a titanium plate and an aluminum alloy plate (i.e., the first plate 5 and the second plate 16) into a composite plate with rollers arranged up and down at different speeds.

Step 220, the heated first plate 5 and the heated second plate 16 are rolled asynchronously, so that the first side surface of the second plate 16 and the first side surface of the first plate 5 are rolled to connect and form the composite plate.

The asynchronous rolling is applied to rolling the first plate 5 and the second plate 16, the first plate 5 and the second plate 16 feature a thickness ratio of 1.5:1.0; a differential speed ratio of the roller corresponding to the first plate 5 to the roller corresponding to the second plate 16 is 1:1.05, and a reduction rate of the asynchronous rolling is 20% to 40%.

In the embodiment of the present invention, the second plate 16 is heated online, that is, the aluminum plate is heated, so that the striations 14 in the surface of the titanium plate are not deformed. The titanium plate and the heated aluminum alloy plate with a lower hardness are rolled to combine by the upper and lower rollers, the aluminum alloy plate's surface that is softened by heating is pressed into the groove in the titanium surface on a contacting surface where the aluminum alloy plate and the titanium plate are combined because of a much greater hardness of the titanium plate than that of the aluminum alloy plate; moreover, the surface of the aluminum alloy plate is cooled to shrink, so that the titanium plate and the aluminum alloy plate are closely attached on both sides of the groove to form an interference fit, thereby forming a strong bonding between the titanium plate and the aluminum alloy plate.

According to the embodiment of the present invention, after asynchronously rolling the heated first plate 5 and the heated second plate 16, the method further includes the steps as follows.

Step 230, the composite plate is subjected to a solid solution treatment,
wherein the solid solution treatment includes a heating stage and a cooling stage, and in the heating stage, the composite plate is put into a solid solution furnace for the solid solution treatment, the solid solution treatment is performed at 250° C. to 450° C. for 45 min to 65 min. In the cooling stage, the composite plate 5 is rapidly cooled and the composite plate is finally cooled to normal temperature. By subjecting the composite plate to the solid solution treatment, the bonding strength of the composite plate is further improved.

Step 240, the composite plate after the solid solution treatment is aged.

An aging treatment is required after the solid solution treatment of the composite plate. The aging treatment is performed in an aging furnace at 160° C. to 200° C. for 5 h to 7 h. By aging the composite plate, the bond strength of the composite plate can be further improved.

The method for manufacturing a composite plate provided in the embodiment of the present invention roughens the first side surface of the first plate 5 so that the first side surface of at least one of the first plate 5 and the second plate 16 is provided with the striations 14, which increases the area of the first plate 5 and the second plate 16 subjected to rolling, hence the composite plate produced by rolling the first plate 5 and the second plate 16 has a higher bonding strength and thus a stronger bonding.

Finally, it should be noted that the above embodiments are merely illustrative of the technical solution of the present invention, rather than limiting it; although the present invention has been described in detail with reference to the foregoing embodiments, those skilled in the art will appreciate that the technical solution disclosed in the above-mentioned embodiments can still be modified, or some of the technical features thereof can be replaced by equivalents; such modifications and equivalents do not depart from the spirit and scope of the embodiments of the present invention in nature.

The invention claimed is:

1. A composite plate comprising:
a first plate having a first side surface and a second plate having a first side surface, wherein the first plate is a titanium plate, a first side surface of the first plate has striations formed therein, each striation is adjacent to at least one other of the striations, more than 90% of all striations in the first plate have a pitch of 0.005 mm to 0.03 mm with respect to any adjacent striation, and the first side surface of the first plate and the first side surface of the second plate are connected by rolling the first and second plates.

2. The composite plate according to claim 1, wherein the first side surface of the first plate has a roughness Ra of 0.8 to 4.0 μm.

3. The composite plate according to claim 1, wherein the first plate has a greater hardness than the second plate.

4. The composite plate according to claim 3, wherein the second plate is an aluminum plate.

5. The composite plate according to claim 1, wherein the composite plate has a shear strength given by the equation $\tau = a*b*K1*K2*\sigma_{soft}$, wherein a is a length of the first plate, b is a width of the first plate, K1 is a roughened area ratio of the first plate and has a value of 1.5 to 3, K2 is a degree of bonding between the first plate and the second plate and has a value of 0.15 to 0.3, the product of K1 and K2 in the equation is set equal to 1 when the actual value of K1*K2 is greater than 1, and $\sigma_{soft}$ is the yield strength of the second plate and has a value of 350 MPA to 412 MPa.

6. The composite plate according to claim 1, wherein the first plate has an elongated shape with a lengthwise side and a widthwise side which is shorter than the lengthwise side, and all the striations extend obliquely with respect to the lengthwise side and the widthwise side in the first side surface of the first plate.

7. A composite plate comprising:
a first plate having a first side surface and a second plate having a first side surface, wherein the first plate is a titanium plate, the first side surface of the first plate has striations formed therein, each striation is adjacent to at least one other of the striations, more than 50% of all striations in the first plate have a pitch of 0.01 mm to 0.02 mm with respect to any adjacent striation, and the first side surface of the first plate and the first side surface of the second plate are connected by rolling the first and second plates.

8. The composite plate according to claim 7, wherein more than 90% of the striations have a pitch of 0.01 mm to 0.02 mm with respect to any adjacent striation.

9. The composite plate according to claim 7, wherein more than 80% of the striations have a pitch of 0.01 mm to 0.02 mm with respect to any adjacent striation.

10. The composite plate according to claim 7, wherein more than 70% of the striations have a pitch of 0.01 mm to 0.02 mm with respect to any adjacent striation.

11. A method for manufacturing the composite plate according to claim 1 comprising:
rubbing the first side surface of the first plate with a roughening friction roller to form the striations in the first side surface; and
asynchronously rolling the first plate and the second plate to obtain the composite plate.

12. The method according to claim 11, wherein the roughening friction roller comprises a grinding belt, a mesh number of the grinding belt is 40 to 120, a pressure applied to the first plate by the grinding belt is 0.1 MPa to 0.5 MPa, a linear speed of the grinding belt is 9-10 m/sec, a speed of the first plate is 4-6 m/min, an overlapping amount of the grinding belt is 0.02 mm, and a grinding belt support roller is made of rubber with a hardness of HS60-75.

13. The method according to claim 11, wherein the first side surface of the first plate has a roughness Ra of 0.8 to 4.0 μm.

14. The method according to claim 13, wherein the first side surface of the second plate has a roughness Ra of 4 to 10 μm.

15. The method according to claim 11, further comprising removing debris from the first side surface of the first plate before asynchronously rolling the first plate and the second plate.

16. The method according to claim 15, further comprising:
acquiring a number of striations per unit area of the first side surface of the first plate after removing debris from the first side surface of the first plate; and
controlling a lifting component to increase a height of the roughening friction roller if it is determined that the number of striations per unit area of the first side surface of the first plate is smaller than a preset value.

17. The method according to claim 11, wherein asynchronously rolling the first plate and the second plate comprises:
heating the first plate and the second plate; and
asynchronously rolling the heated first plate and the heated second plate so that the first side surface of the second plate and the first side surface of the first plate are rolled to connect and produce the composite plate.

18. The method according to claim 17, further comprising:
subjecting the composite plate to a solid solution treatment after asynchronously rolling the heated first plate and the heated second plate; and
subjecting the composite plate to an aging treatment after the solid solution treatment.

19. The method according to claim 18, wherein the solid solution treatment is performed at 250° C. to 450° C. for 45 min to 65 min, and the aging treatment is performed at 160° C. to 200° C. for 5 h to 7 h.

20. The method according to claim 11, wherein the roughening friction roller comprises a grinding wheel, a mesh number of the grinding wheel is 40 to 120, a pressure applied to the first plate by the grinding wheel is 0.1 MPa to 0.5 MPa, and a diameter of the grinding wheel is 200 mm to 400 mm.

* * * * *